US007010386B2

(12) United States Patent
McDonnell et al.

(10) Patent No.: US 7,010,386 B2
(45) Date of Patent: Mar. 7, 2006

(54) TOOL WEAR MONITORING SYSTEM

(76) Inventors: Ryan P. McDonnell, 848 Palmer Rd., Columbus, OH (US) 43212; Timothy R. McDonnell, P.O. Box 658, LaGrange, OH (US) 44050

( * ) Notice: Subject to any disclaimer, the term of this patent is extended or adjusted under 35 U.S.C. 154(b) by 480 days.

(21) Appl. No.: 10/104,201

(22) Filed: Mar. 22, 2002

(65) Prior Publication Data
US 2003/0182014 A1 Sep. 25, 2003

(51) Int. Cl.
G06F 19/00 (2006.01)
(52) U.S. Cl. ............... 700/175; 700/159; 702/182; 340/679
(58) Field of Classification Search ............ 700/117, 700/159, 174, 175; 340/540, 679, 680
See application file for complete search history.

(56) References Cited

U.S. PATENT DOCUMENTS

| 4,251,872 A | 2/1981 | Bone |
| 4,296,364 A | 10/1981 | Fukuyama et al. |
| 4,326,257 A | 4/1982 | Sata et al. |
| 4,351,029 A | 9/1982 | Maxey et al. |
| 4,442,494 A | 4/1984 | Fromson et al. |
| 4,456,960 A | 6/1984 | Wakai |
| 4,471,444 A | 9/1984 | Yee et al. |
| 4,497,029 A | 1/1985 | Kiyokawa |
| 4,558,311 A | 12/1985 | Forsgren et al. |
| 4,559,600 A | 12/1985 | Rao |
| 4,591,989 A | 5/1986 | Tanaka |
| 4,608,644 A | 8/1986 | Kiya |
| 4,628,458 A | 12/1986 | Ohta et al. |
| 4,658,245 A | 4/1987 | Dye et al. |
| 5,070,655 A | 12/1991 | Aggarwal |
| 5,243,533 A | 9/1993 | Takagi et al. |
| 5,345,390 A | 9/1994 | Greenip, Jr. et al. |
| 5,428,556 A | 6/1995 | Torizawa et al. |
| 5,446,672 A | 8/1995 | Boldys |
| 5,485,391 A | 1/1996 | Lindstrom |
| 5,568,028 A | 10/1996 | Uchiyama et al. |
| 5,587,931 A | 12/1996 | Jones et al. |
| 5,602,347 A | 2/1997 | Matsubara et al. |

(Continued)

Primary Examiner—Jayprakash N. Gandhi
(74) Attorney, Agent, or Firm—Fay, Sharpe, Fagan, Minnich & McKee, LLP

(57) ABSTRACT

A monitoring apparatus for monitoring one or more manufacturing machines having a plurality of component tools and engaged in repetitive machining of a part is provided. An input device detects occurrence of a machine cycle. A counter stores the number of detected machine cycles as a count value. A machine speed processor estimates a temporal rate at which the machine cycles occur. A data storage device stores a maintenance schedule indicating the number of machine cycles between recommended replacements for each tool. A tools processor estimates a remaining operating time for each tool before scheduled replacement. A machine viability processor estimates a remaining operating time for the machine before schedule replacement of each of the component tools. A display device displays the operating time for the machine before scheduled replacement of each of the component tools. A method for monitoring a cycling manufacturing machine includes detecting machine cycles of the manufacturing machine, estimating a machine operating rate based on the detecting step over time, and projecting tool change times for each of the plurality of tools based on the estimated machine operating rate and pre-selected tool cycle lifetime values for each of the plurality of tools.

34 Claims, 14 Drawing Sheets

U.S. PATENT DOCUMENTS

| | | |
|---|---|---|
| 5,689,062 A | 11/1997 | Jawahir et al. |
| 5,691,904 A | 11/1997 | Lysen |
| 5,757,648 A | 5/1998 | Nakamura |
| 5,787,002 A | 7/1998 | Iwamoto et al. |
| 5,857,166 A | 1/1999 | Kim |
| 5,880,965 A | 3/1999 | Nakamura et al. |
| 6,055,461 A | 4/2000 | Sumiyama et al. |
| 6,804,619 B1 * | 10/2004 | Chong et al. ............. 702/84 |

* cited by examiner

Tooling Display & Setup Screen

| | Tool Description | Cycle Life | Cycle Count | Count Reset | RPM | S.F./Min | Comments |
|---|---|---|---|---|---|---|---|
| 1 | 5/8 DIA SPOT DRILL | 2000 | 1753 | Reset | 0 | 0 | |
| 2 | DOVETAIL FORM T1620 | 500 | 263 | Reset | 0 | 0 | |
| 3 | LTR "R" DIA. DRILL | 250 | 13 | Reset | 0 | 0 | |
| 4 | DOVETAIL FORM T1622 | 1500 | 1284 | Reset | 0 | 0 | watch .020 corner radius |
| 5 | 1/8" NPT TAP | 325 | 89 | Reset | 0 | 0 | |
| 6 | 3/4" NPT THREADROLL | 5000 | 1035 | Reset | 0 | 0 | use customer supplied gages |
| 7 | 1/8" BREAKDOWN AND CHAPHER T560 | 550 | 374 | Reset | 0 | 0 | |
| 8 | 1/8" CUT-OFF | 550 | | Reset | 0 | 0 | |
| 9 | | | | | | | |
| 10 | ORDER COMPLETE | 35000 | 28595 | Reset | 0 | 0 | due 3/31/02 |
| 11 | | 0 | | Reset | 0 | 0 | |
| 12 | | 0 | | Reset | 0 | 0 | |
| 13 | | 0 | | Reset | 0 | 0 | |
| 14 | | 0 | | Reset | 0 | 0 | |
| 15 | | 0 | | Reset | 0 | 0 | |
| 16 | | 0 | | Reset | 0 | 0 | |

ToolSentinel: Report Display

ToolSentinel System : Life Cycle Change Report

Start Date: 1/1/02  End Date: 1/15/02
Time: 06:00  Time: 06:00

| Mach. | Part. No. | Tool No. | Time Changed | Prior | New | Changed By |
|---|---|---|---|---|---|---|
| 2 | 001034 | 4 | 1/9/02 6:41:28 AM | 5,000 | 4,500 | Supervisor |
| 2 | 001034 | 7 | 1/9/02 6:41:28 AM | 5,000 | 4,500 | Supervisor |

Save To File | Print to Printer | UP | DOWN | Exit

160

TOOL WEAR MONITORING SYSTEM

BACKGROUND OF THE INVENTION

The invention relates to automated manufacturing. It particularly relates to the monitoring of automated machine tools in process lines, manufacturing sites and other industrial settings, and will be described with particular reference thereto. However, the invention also finds application in other automated manufacturing processes where prompt scheduled maintenance or replacement of components of the manufacturing equipment is advantageous.

Typical materials processing lines or manufacturing sites include a plurality of machines, each performing one or more processing steps. The machines can, for example, be single- or multiple-spindle automatic screw machines, dial index/rotary transfer machines, transfer lines, or the like. Each machine in the process line typically includes a plurality of specialized tools that cut, drill, turn, polish, or otherwise work, process, or modify a work piece. Each machine usually operates on a cyclic basis systematically repeating a set of machine cycles that typically produce a single part per machine cycle. It is to be appreciated that some machines can produce more than one part per cycle.

In an industrial environment, an important consideration is maximizing throughput of such machinery. Hence, the machines preferably operate essentially continuously, each at a steady cyclic machine operating rate that produces the parts at a substantially constant rate.

However, materials processing machines typically involve cutting and/or abrasive interaction between the component tools or tool inserts and the work piece. This cutting and/or abrasion eventually results in a dulling of the tool cutting surfaces or other tool degradation which is usually correctable by sharpening the affected tool. Machines with dull tooling are periodically paused or taken off line to replace the dull tool with a freshly sharpened new tool or to perform other maintenance.

In an industrial environment, tool maintenance shutdowns are preferably anticipated and scheduled. An unanticipated shutdown, such as due to a catastrophic tool failure, can shut down operations at an inopportune time, e.g. when a delivery deadline is approaching. Scheduled replacement of tools is typically less expensive than recovering from a catastrophic failure of a degraded tool which may in turn affect or damage other tools or machines in the process line. Furthermore, replacement of tools on a schedule determined by the tool manufacturer's recommendation and/or past experience of the manufacturing site greatly reduces the likelihood of producing defective parts due to sub-standard or non-optimized machine tool performance. Scheduling tool replacements also assists in inventory maintenance because acquisition of the replacement tools can be appropriately scheduled. Lastly, overused and/or broken tooling usually cannot be simply resharpened and must be replaced at a typically large expense. A tool changed at the appropriate time can most often be resharpened and reused, thus extending its useful life.

Although the benefits of scheduled tool replacements are well recognized in industry, a problem arises in projecting the timing of such replacements and, thereafter, actually exercising the replacement. Typically, a component tool is assigned a tool life in terms of the number of machine cycles, e.g. a drill bit may be expected to perform adequately for 2,000 machine cycles. The number of tool life cycles will usually depend on several factors, including the type of workpiece, the material being machined, and the machine operating rate. For a typical process line, the cyclic tool life can be established by prior experience, e.g. by visually examining the tool after its removal to determine the extent of degradation. However, knowledge of tool life in terms of the number of cycles does not directly translate into a real-time projection of the actual tool life, e.g. in units of minutes, and more particularly into a realistic projection of the optimal time for replacing the tool.

The projection problem is exasperated by the environment of a typical industrial machine shops in which machine operators are attempting to cooperate with other machines and parts in the process line and are frequently working against short delivery schedules. This environment is not conducive to rigorously estimating and following tool replacement schedules. As a result, tools are often replaced at non-optimal times, resulting in unnecessary shutdowns, catastrophic tool failures, production of defective parts, higher tool costs, increased scrap material, inaccurate manufacturing cost estimation, and hosts of other negative consequences.

The prior art includes a number of systems directed toward monitoring machines to facilitate tool replacement or other maintenance. Many of these systems measure characteristics of the tool, such as vibration or power consumption, to detect and report impending or existing failure. These systems do not respond until after some detectable degradation of the tool has occurred, and do not project the timing of the replacement. These systems, therefore, are not proactive but, rather, are simply reactive.

U.S. Pat. No. 5,880,965 issued to Nakamura et al. discloses a method for analyzing work schedules to identify foreseeable problems. The method does not, however, monitor the actual performance of the manufacturing machines. U.S. Pat. No. 5,446,572 issued to Boldys discloses a system for tracking the number of machine cycles in which a tool is used, and also provides a visual indication of when the cycle count reaches warning and limit values. However, these values are reported in terms of machine cycles, so that the actual tool replacement time must be calculated as an additional step by machine operators who frequently are occupied in other tasks.

The present invention contemplates an improved tool wear monitoring system and method that overcomes the above-mentioned limitations and others.

BRIEF SUMMARY OF THE INVENTION

In accordance with one aspect of the present invention, a method for monitoring a set of manufacturing machines, each having at least one associated tool, is provided. The method is proactive in monitoring tool life and is well suited for use with manufacturing machines engaged in repetitive production of machined parts at a substantially uniform production rate. The method is preferably executed on an electronic device having a display device for displaying information to an associated human operator. The method includes the steps of receiving a tool life parameter value for each of the associated tools, the parameter value representing an expected number of machined parts to be produced by the associated tool. Machine cycles of the manufacturing machines are detected and tracked. Operating rates of the manufacturing machines are calculated based on the number of machine cycles per unit of time, preferably cycles per minute. Lastly, the times remaining until tool replacement are estimated based on the number of machine cycles executed, the machine operating rates, and the stored tool life parameter values.

In accordance with another aspect of the invention, a monitoring apparatus is provided for monitoring a manufacturing machine having a plurality of component tools and engaged in repetitive machining of a part through machine cycles. The monitoring apparatus includes an input device adapted to detect occurrences of a machine cycle as a machine cycle count. A counter stores the machine cycle count. A machine speed processor estimates a temporal rate at which the machine cycles occur. A data storage device stores a maintenance schedule indicating the number of machine cycles between recommended replacement for each tool. A tools processor estimates a remaining operating time for each tool before scheduled replacement. A machine viability processor estimates a remaining operating time for the machine before scheduled replacement of each of the component tools. Lastly, a display device displays the operating time remaining for the machine before scheduled replacement of each of the component tools is required.

In accordance with yet another aspect of the invention, a method for monitoring a cycling manufacturing machine having a plurality of tools is provided. The method detects machine cycles of the manufacturing machine, estimates a machine operating rate based on the detecting step over time, and projects tool change times for each of the plurality of tools based on the estimated machine operating rate and pre-selected tool cycle lifetime values for each of the plurality of tools.

In accordance with still yet a further aspect of the invention, a monitoring device for monitoring at least one cycling manufacturing machine having a plurality of component tools is provided. The monitoring device includes a counter, a processor, and at least one visual indicator corresponding to at least one cycling manufacturing machine. The visual indicator is in operative communication with the processor and includes first, second, and third indicia corresponding to a status of the cycling machine. The first indicia corresponds to the at least one cycling machine having one or more than one threshold time increments remaining before scheduled replacement of any of its component tools. The second indicia corresponds to the at least one cycling machine having a positive time value remaining before scheduled replacement of any of its component tools and having less than a threshold time before scheduled replacement of at least one of its component tools. Lastly, the third indicia corresponds to at least one cycling machine working beyond the scheduled replacement time of at least one of its component tools. The visual indicia are displayed for each tool of all machines associated with the monitoring apparatus.

Numerous advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 4 shows a tooling display on the monitoring apparatus of the present invention for a single machine.

FIG. 11 shows a report creator display of the of the monitoring apparatus in accordance with the invention.

FIG. 12 shows a life cycle display of the monitoring apparatus in accordance with the invention.

DETAILED DESCRIPTION OF THE INVENTION

Figure 1:
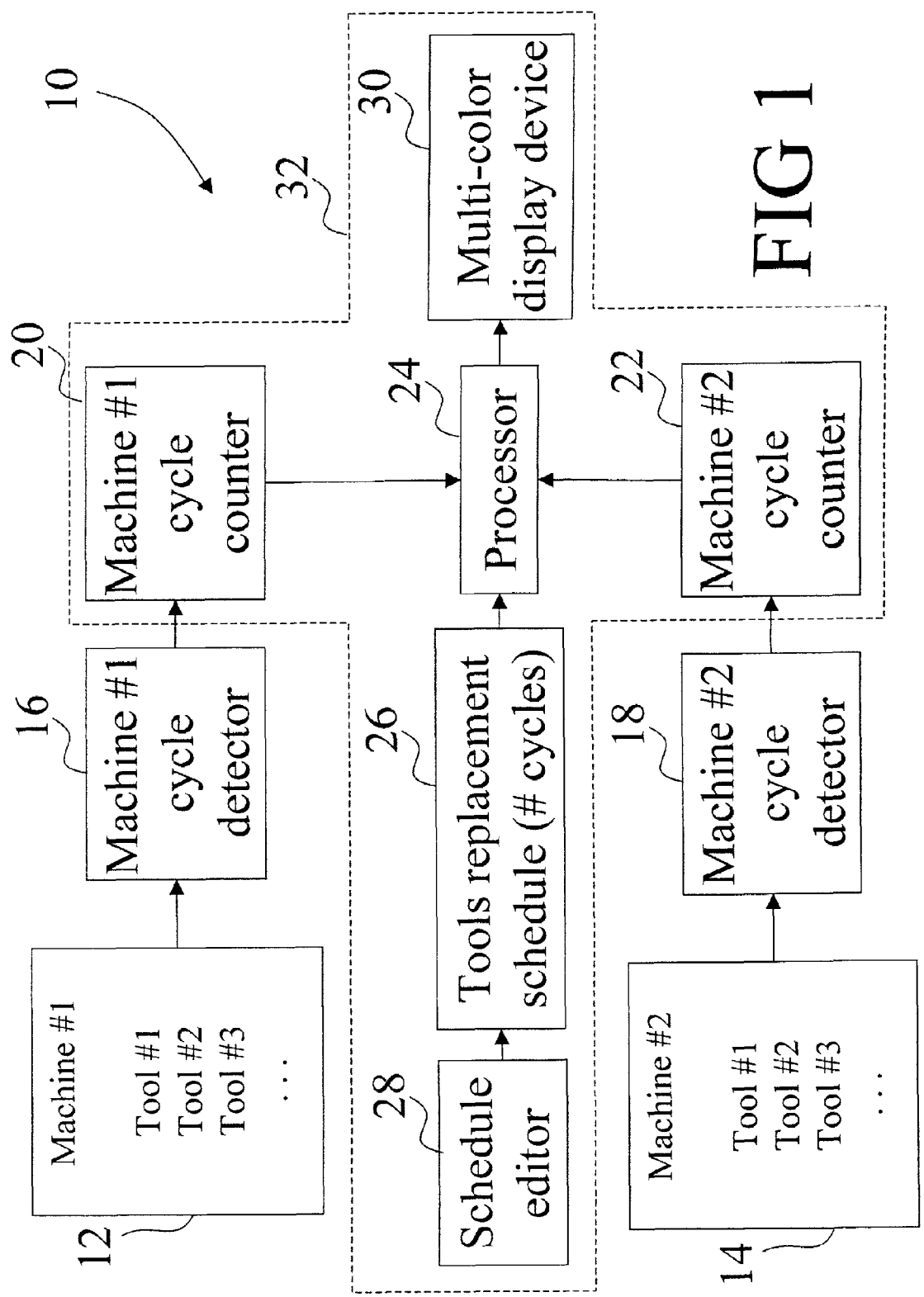
FIG. 1 shows a schematic diagram of a monitoring apparatus for monitoring a plurality of cycling manufacturing machines each having a plurality of component tools in accordance with an embodiment of the invention.

With reference to FIG. 1, an apparatus 10 for monitoring the status of a plurality of machines 12, 14 at a manufacturing site is shown. The machines 12, 14 can be of any type, for example, they may be single- or multiple-spindle automatic screw machines, dial index/rotary transfer machines, transfer lines, or the like. Although two machines are shown in FIG. 1, it will be recognized that the invention is compatible with an arbitrary number of machines.

Each machine 12, 14 typically includes a plurality of component tools that cut, drill, turn, grind, thread, form, or otherwise work, process, or modify a workpiece. Each machine 12, 14 operates on a cyclic basis in which each machine cycle typically produces a single part. In an industrial environment, an important consideration is maximizing throughput of such machinery. Hence, the machines 12, 14 preferably operate essentially continuously, each at a substantially steady operating rate, uninterrupted except for periodic maintenance and/or tool change shutdowns.

Each machine 12, 14 has a corresponding suitably arranged machine cycle detector 16, 18 such as a mechanical cam and switch mechanism (not shown) that detects the occurrence of machine cycles. A corresponding machine cycle counter 20, 22 provided in the subject apparatus 10 tracks the number of cycles executed by each machine. The machine cycle detectors 16, 18 can take various forms. In one detector embodiment, an additional sensor (not shown) detects a machine operation that occurs a known number of times, e.g. once, per cycle. In another detector embodiment, the output of a machine cycle sensor (not shown) is integral with the machine is used. In this latter case, it is often advantageous to include filtering and isolation circuitry between the built-in machine cycle sensor and the counter 20, 22.

Figure 2:
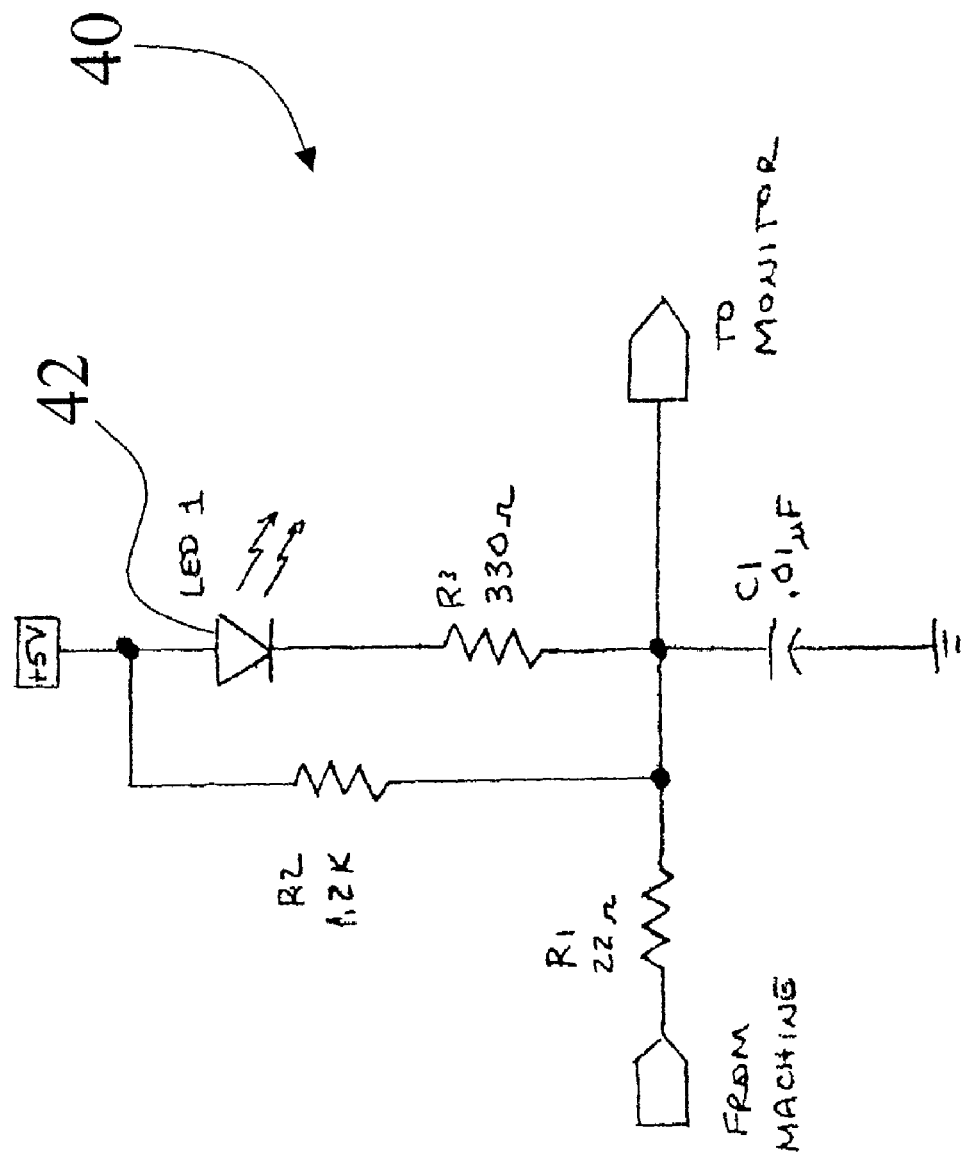
FIG. 2 shows a passive filtering and isolation circuit for transferring the output of an integral machine cycle sensor to the monitoring apparatus of the invention.

FIG. 2 shows a preferred hardware embodiment of a passive filtering and isolation circuit 40 that is suitable for transferring the output of an integral machine cycle sensor to the monitoring apparatus, e.g. to the counter 20, 22. The circuit 40 includes a light emitting diode 42 to provide a visual indicator of occurrence of a machine cycle.

With reference again to FIG. 1, the detectors 16, 18, provide data input to the counters 20, 22 which track the total number of machine cycles. The counters 20, 22 in turn communicate with a processor 24 which performs the calculations for projecting tool replacement times. The processor performs the projection calculations based on the time-dependent counter 20, 22 values and based on a tools replacement schedule 26 that stores the expected tool cycle life in units of machine cycles. Preferably, the schedule 26 is updateable by a human machine operator using an interface including a schedule editor 28. The output of the processor 24 preferably includes actual projected tool replacement times. However, if desired, tool life remaining in terms of machine cycles can be calculated and displayed as well.

Information pertaining to the tool replacement times and corresponding machine shut down times is displayed on a multi-color display device 30. By using a plurality of colors, e.g. white background to indicate the machine is not running at all, green to indicate the machine is running well, yellow to indicate that at least one tool should be replaced "soon", and red to indicate that at least one tool has been used beyond its scheduled cycle life, the display device 30 provides the operator with an intuitive and easily interpreted indication of the status of the machines 12, 14.

In the preferred embodiment, the machine cycle counters 20, 22, the processor 24, tools replacement cyclic schedule table 26, schedule editor 28, and multi-color display device 30 are provided as a single computer system 32, e.g. as a personal computer or a workstation. Although integration of the major apparatus components into a computer system 32 is preferred, the apparatus 10 could also be formed using predominantly discrete components. For example, the multi-color display device 30 could include plurality of status indicators, each associated with a machine, such as ruggedized colored shop bulbs, known in the art as a "Christmas tree", of suitable colors.

Figure 3:
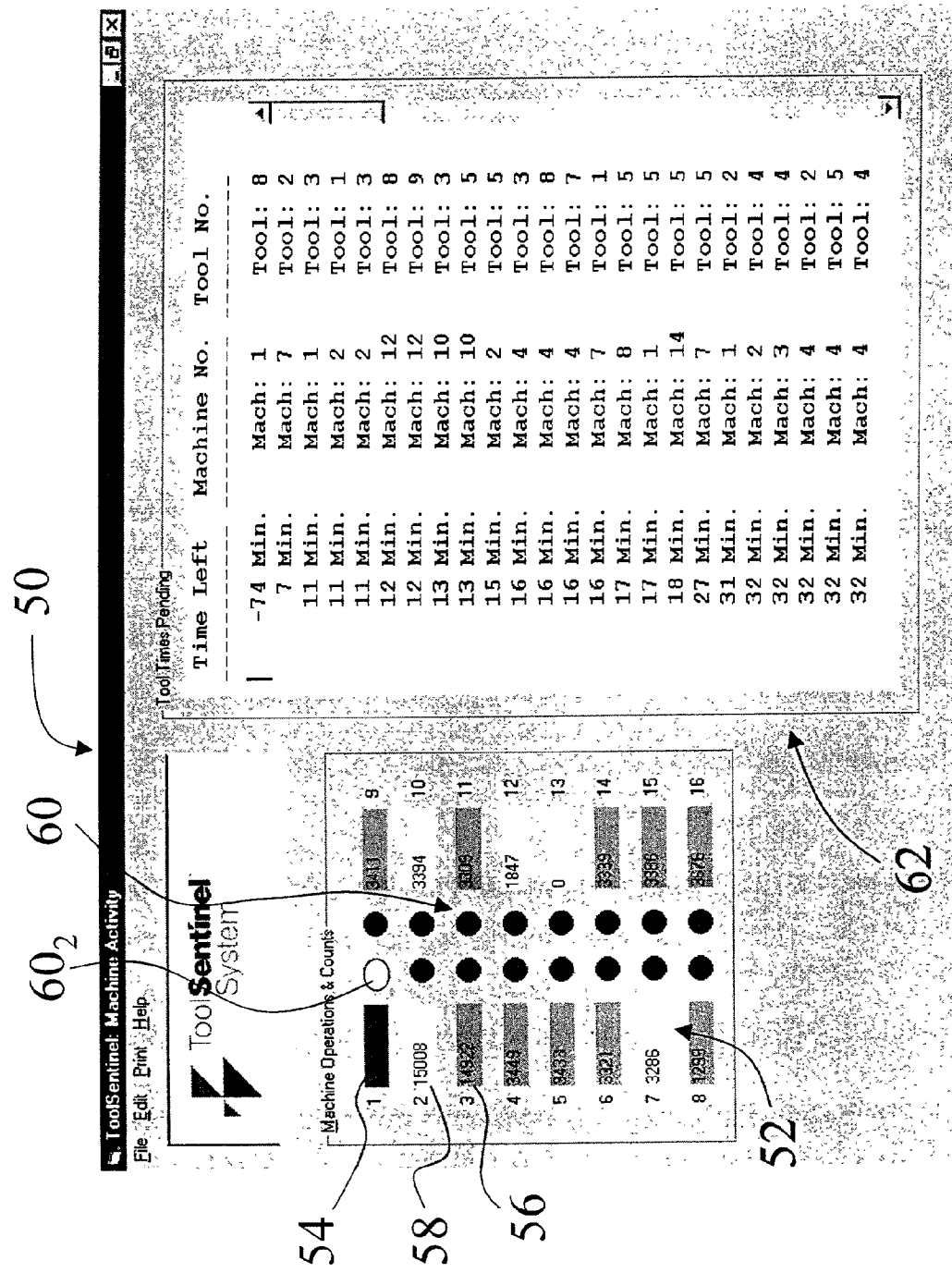
FIG. 3 shows a main display of the monitoring apparatus in accordance with the invention.

With reference next to FIG. 3, a preferred main display screen 50 which is displayed on the multi-color display device 30 is shown. The display 50 includes a panel entitled "Machine Operations & Counts" 52 that shows the status of each monitored machine. In the illustrated embodiment, the apparatus is capable of monitoring up to sixteen individual machines numbered 1 . . . 16, but only fifteen machines are currently operating. It is to be appreciated that the present invention is not limited to use with sixteen machines. The panel 52 displays information including the current number of counted machine cycles: 15023 cycles for machine #1; 15008 cycles for machine #2; 14922 cycles for machine #3; and so forth. Machine #13 is not running or is off-line, and hence shows 0 cycles. The background of the count displays are preferably color coded to provide a quick easily understood visual indication of the operational status of each machine. A background color of "white", e.g., machine #13, indicates a machine which is not running or is off-line.

As seen in FIG. 3, machine #1 has a red count background 54, indicating that it has at least one tool which is overdue for scheduled replacement. Machine #3 has a green count background 56, indicating that none of its component tools are scheduled for replacement in less than a user-related threshold time interval, e.g. 15 min. Machine #2 has a yellow count background 58, indicating that none of its component tools are scheduled for imminent replacement, but that at least one tool is scheduled for replacement within one user selected time interval period, e.g. 15 min or less. It will be appreciated by those skilled in the art that the precise color indicated above by "green", "yellow", and "red" is not critical, and other colors can be used. Generally, however, the human eye detects reddish colors quickly and people generally associate red with urgency. Similarly, green is typically associated with an acceptable status. Preferably, the "green" color corresponds to illumination with primary wavelength less than 560 nm, "red" color corresponds to illumination with primary wavelength greater than 610 nm, and "yellow" color corresponds to illumination with a primary wavelength between 560 nm and 610 nm.

The display panel 52 of the main display screen 50 also includes indicators 60 that are operatively connected with the machine cycle detector, e.g. detectors 16, 18, corresponding the machine. The indicators 60 change state, preferably light up or otherwise change in appearance, when completion of a machine cycle is detected, e.g. as shown for the indicator $60_2$ corresponding to machine #1.

As also seen in FIG. 3, the display screen 50 includes a second panel 62 entitled "Tool Times Pending". The panel 62 provides a list of every tool of all of the operating machines sorted by the time pending until scheduled tool replacement. Standard "scroll" buttons are provided so that additional tools in the list that are not shown on the screen can be viewed. It will be seen that machine #1 has four tools, numbered 2, 3, 5, and 8. Tool 8 is overdue for scheduled tool replacement by 74 minutes. (The negative sign of "−74" minutes indicates that the replacement is past due). This tool is the source of the red count background 54 for machine #1 in the "Machine Operations & Counts" panel 52, Machine #2, which has a yellow count background 58 in the "Machine Operations & Counts" panel 52, has tools numbered 1, 3, 4, and 5 which are due for scheduled replacement in 11 minutes, 11 minutes, 32 minutes, and 15 minutes, respectively. In the illustrated embodiment, 11 minutes is within the user selectable threshold for providing the user with a yellow indicator that indicates pending tool replacement is scheduled. It will also be observed that machine #3 has only a single tool numbered 4 which is not due for scheduled replacement for 32 minutes. As this time is positive and longer than the threshold time assigned by the user to that tool, the green count background 56 is associated with machine #3 in the "Machine Operations & Counts" panel 52. The panel 62 is thus seen to provide the operator with a useful summary of the scheduled tool replacements given the present operating conditions and machine operating rates.

The display screen 50 provides the machine operator with the relevant useful monitoring information at-a-glance, but does not effectuate updating, e.g. when a tool is in fact replaced. With reference now to FIG. 4, the preferred user interface display screen 70 which is suitable for such updating is described. The display screen 70 is preferably accessed through the display screen 50 in a simple and intuitive manner, such as by double-clicking on the counter display 54, 56, 58 corresponding to the machine which is to be selected.

With reference to FIG. 4, the user interface display screen 70 provides information regarding the tools of a particular machine, e.g. the machine #1 as indicated in the "Machine" dialog 72. Information columns are provided, including: "Tool Description"; "Cycle Life"; "Cycle Count"; "RPM"; "S.F./Min"; and "Comments". The "Tool Description" and "Comments" columns are text fields for holding data relating to a general description of the total and operator's comments regarding the tool, respectively. "Cycle Life" refers to the number of cycles a new tool can endure, expressed in terms of machine cycles. This value is user-selected based on the tool manufacturer's recommended tool life, prior experience of the tool life in the production line, operator initiation, or similar sources. "Cycle Count" is the number of cycles remaining for the currently installed tool. The "Cycle Count" decrements toward zero each time the corresponding machine executes a machine cycle. In one embodiment, the "Cycle Count" for each tool is color coded to indicate the temporal proximity of the next replacement of that tool, e.g. using a green/yellow/red color scheme similar to that used for the machine count 54, 56, 58 in FIG. 3. Preferably, the "Cycle Count" decrements below zero to indicate that the current tool is overdue for replacement, and by how many cycles, as shown for the tool numbered 8 in FIG. 4. A count "Reset" button 74 is provided for each tool to enable the operator to reset the "Cycle Count" to its initial value, i.e. to the corresponding "Cycle Life" value, when the current tool is in fact replaced. The "RPM" and "S.F./Min" columns provide a field to receive information on the revolutions per minute or surface feet per minute operating parameter of the tool, respectively, insofar as it applies and is useful. It is to be appreciated that these are physical description fields.

In addition to the columns of information relating to the tools, general information about the machine operation is also selectively provided. In the preferred display 70, such auxiliary information includes: "Part", i.e. an identifier for the part being produced by the machine; "Machine Count", i.e. number of parts produced so far; "Work Order" and "Revision No." therefor; and selected user authorization dialogs including "Authorization Name" and "Password". Optionally, the latter can be used to limit the ability to change machine and/or tool settings to authorized operators or other authorized individuals.

The information contained in tooling setup screen 70 shown in FIG. 4 corresponds to an existing part or job running on machine #1 which is in turn connected to the monitoring apparatus 10. Preferably, the tooling setup 70 or a similar interfacing element is also usable in an off-line mode. For example, when a new part or job is commissioned, it is advantageous to set up the tooling parameters of the monitoring apparatus 10 for monitoring the new job prior to placing the machine on line on the shop floor. This permits the tooling parameters to be adjusted without impacting machine run time. Advantageously, certain options of the tooling setup 70, such as the reset buttons 74, are disabled when performing off-line tooling setup.

It is to be appreciated that all job set-up sheets can be saved in the subject system. The set of sheets can be used over again such as when jobs previously run are again commissioned. Additionally, the set of sheets and jobs can be moved to other machines, reviewed for estimating quotations on similar new jobs, examined for cost-profit analysis, continuous improvements, and the like. Rather than starting new jobs from scratch, previously saved jobs can be modified as necessary in order to manufacture the new parts commissioned. Tool life parameters can be compared between manufacturers of identical tools. Archived jobs can be used for historical analysis as well. Essentially, the archived jobs are useful for a wide range of activities.

Figure 5:
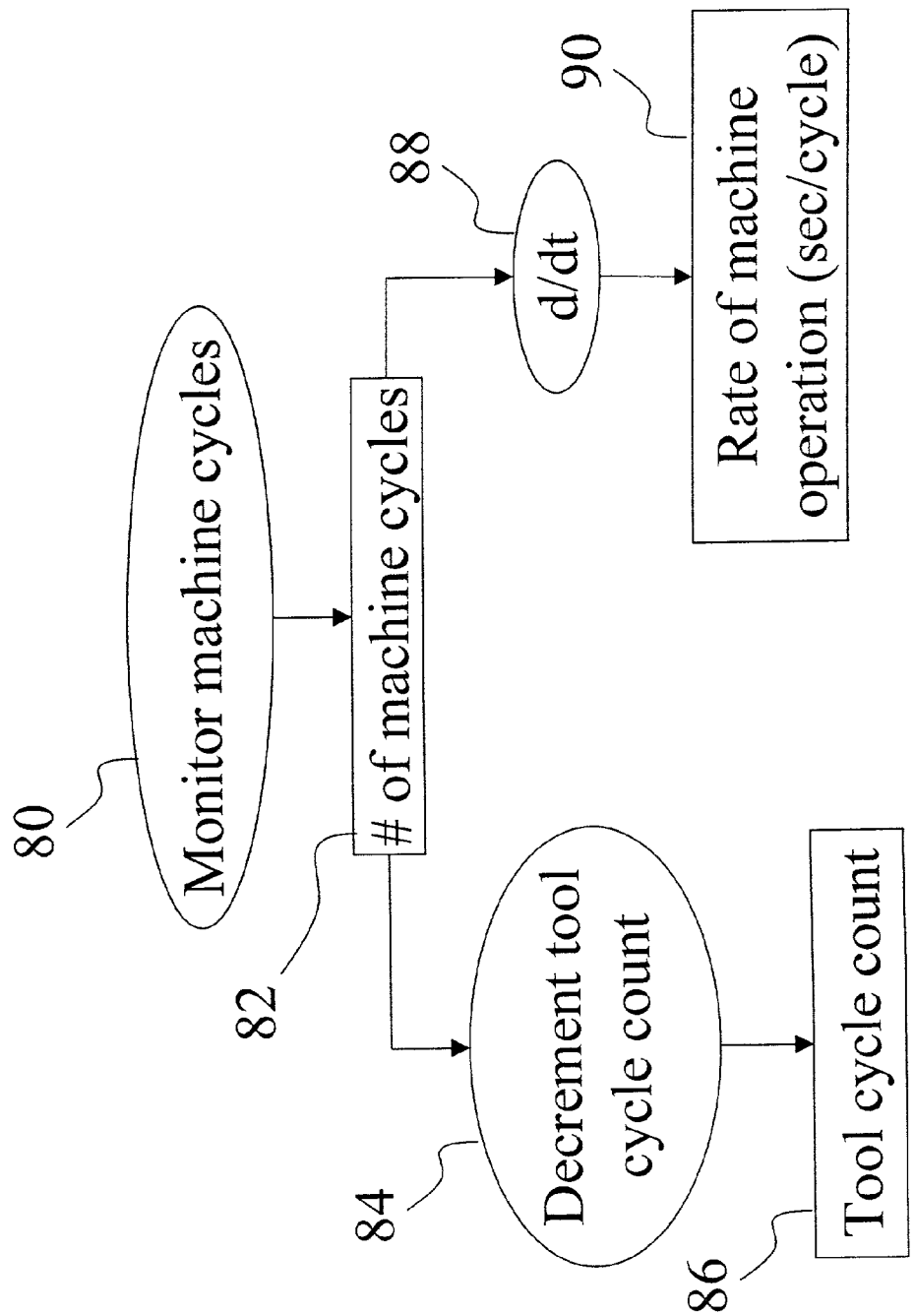
FIG. 5 is a flow diagram of a method for measuring the number of machine cycles and for calculating the machine operating rate in accordance the preferred embodiment of the invention.
Figure 6:
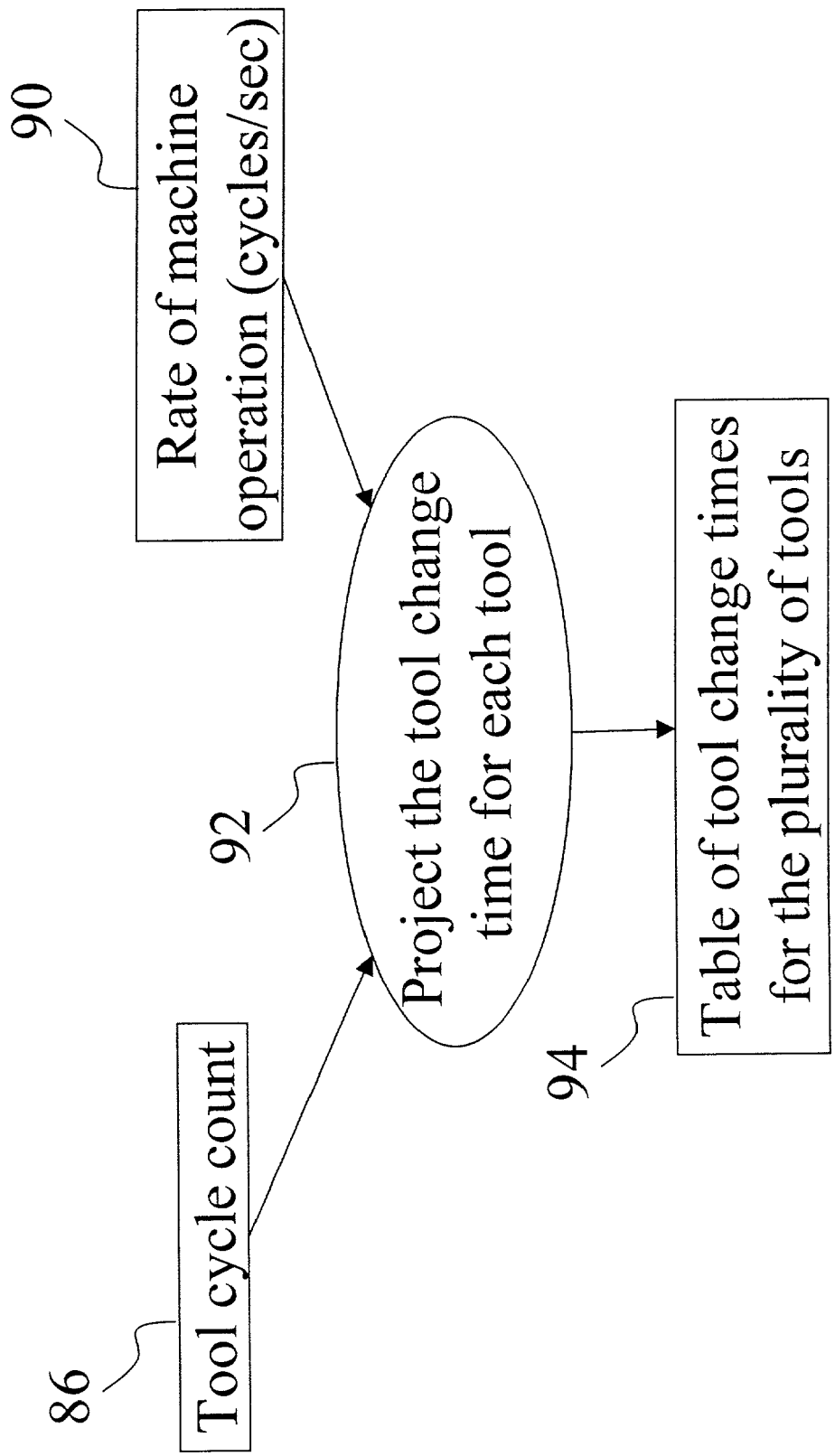
FIG. 6 is a flow diagram of a method for generating a table of tool change times for a plurality of tools in accordance with the preferred embodiment of the invention.
Figure 7:
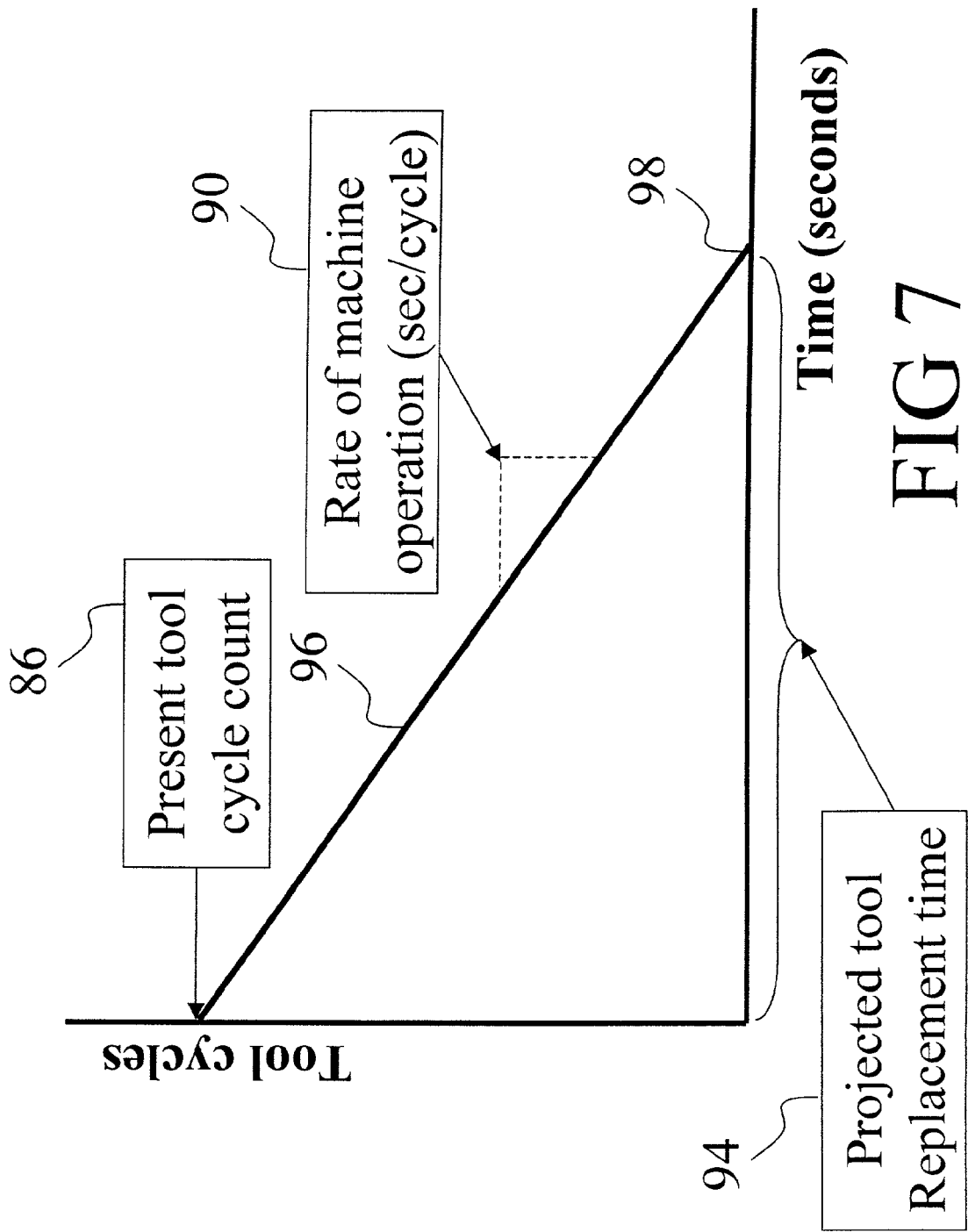
FIG. 7 is a graphical plot showing a method for projecting a tool replacement time based on the current number of machine cycles and the machine operating rate in accordance with the preferred embodiment of the invention.

With reference to FIGS. 5 through 7, a preferred method for performing the tool replacement time projections will be described. As diagrammed in FIG. 5, the machine cycling is monitored 80 to maintain a running total of the number of machine cycles 82. For each machine cycle, the tool cycle count is decremented 84 to maintain a running value of the tool cycle count 86. The decrementing 84 is repeated for each tool of the cycled machine. The number of machine cycles 82 is also operatively differentiated 88 to obtain a machine operation rate 90, for example in units of seconds per cycles. The differentiation 88 can be performed numerically, e.g. by averaging the number of machine cycles over a selected or fixed time interval window. Since, as mentioned previously, machines in production lines are typically operated at a relatively uniform rate, simple averaging is typically adequate. Preferably, a moving average is used to recalculate the operating rate value to compensate for production runs that speed up or slow down due to conditions such as temperature, gear ratio changes, machine wear, and other factors. Of course, more complex numerical differentiation methods known in the mathematical arts can be employed as desired.

With reference next to FIG. 6, the tool cycle count 86 and the machine operation rate 90 are used to project the tool change time for each tool 92. The projecting step(s) 92 is/are repeated for each tool of the cycled machine to produce a table of tool change times for the plurality of tools 94.

With reference to FIG. 7, a preferred method for projecting 92 the replacement time for a tool is described. Given the present tool cycle count 86 and the rate of machine operation 90, which is assumed to be linear, a linear plot 96 is calculated starting at the present tool cycle count 86 and proceeding downward with a slope magnitude corresponding to the machine operation rate 90. At a point 98 the plotted line 96 reaches zero tool cycle counts. The time interval between the present and the time when the tool cycle count reaches zero is the projected tool replacement time 94.

Figure 8:
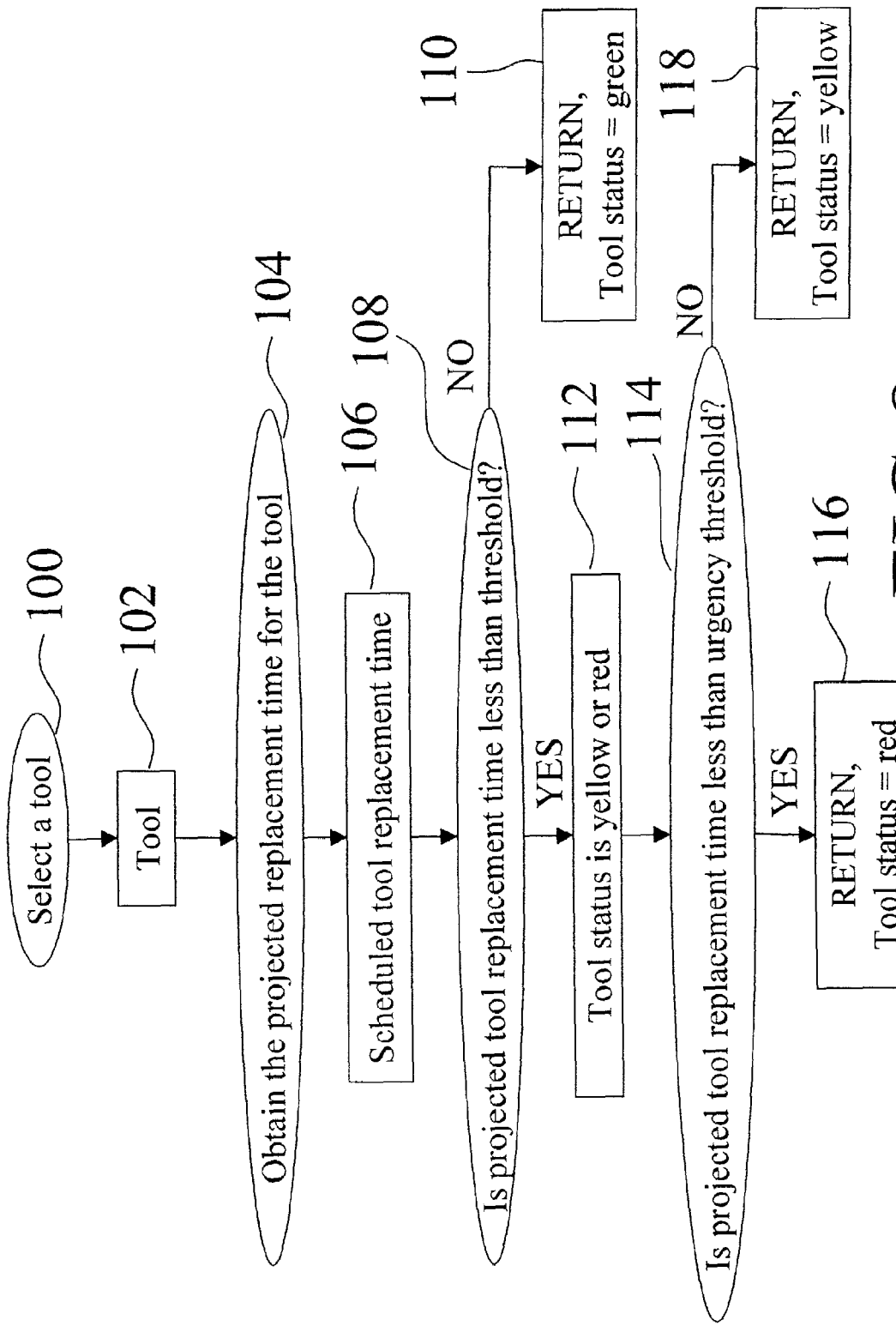
FIG. 8 is a flow diagram of a method for selecting an appropriate tool status color in accordance with the preferred embodiment of the invention.

With reference to FIG. 8, the preferred method for selecting the count background color to indicate the status of a tool is described. In a selection 100, the tool is selected 102. The replacement time for the tool is calculated 104, e.g. using the method previously described with reference to FIGS. 5 through 7, to yield a scheduled tool replacement time 106. This time 106 is compared 108 with a threshold time below which the operator is to be notified of the impending scheduled tool changeout. If the scheduled replacement time 106 is not less than the threshold, a green indicator is returned 110. If the scheduled replacement time 106 is, however, less than the threshold, then the appropriate indicator is yellow or red 112. A typical value for the threshold is fifteen minutes, but this value is preferably adjustable by the operator.

If the tool status is either yellow or red 112, then the scheduled replacement time 106 is checked 114 against an urgency threshold. Typically, the urgency threshold is zero, i.e. a tool which is overdue for replacement triggers the red urgency indicator 116. If the scheduled changeout is greater than the urgency threshold, then a yellow tool status is preferably returned 118.

It will be appreciated that the method of FIG. 8 is repeated for each tool of a machine. After each tool is assigned a status, e.g. green, yellow, or red, the machine as a whole can be assigned a status, e.g. the status color indicator 54, 56, 58 shown in FIG. 3. If any tool has a red status indicating urgent replacement, then the machine is assigned red status. If no tools have red status but one or more tools have a yellow status indicating an impending changeout status, then the machine is assigned a yellow status. Finally, if every tool of the machine is assigned a green status, then the machine is assigned a green status indicating that no tool changes are imminent, where "imminent" is defined by the threshold time, e.g. fifteen minutes.

Figure 9:
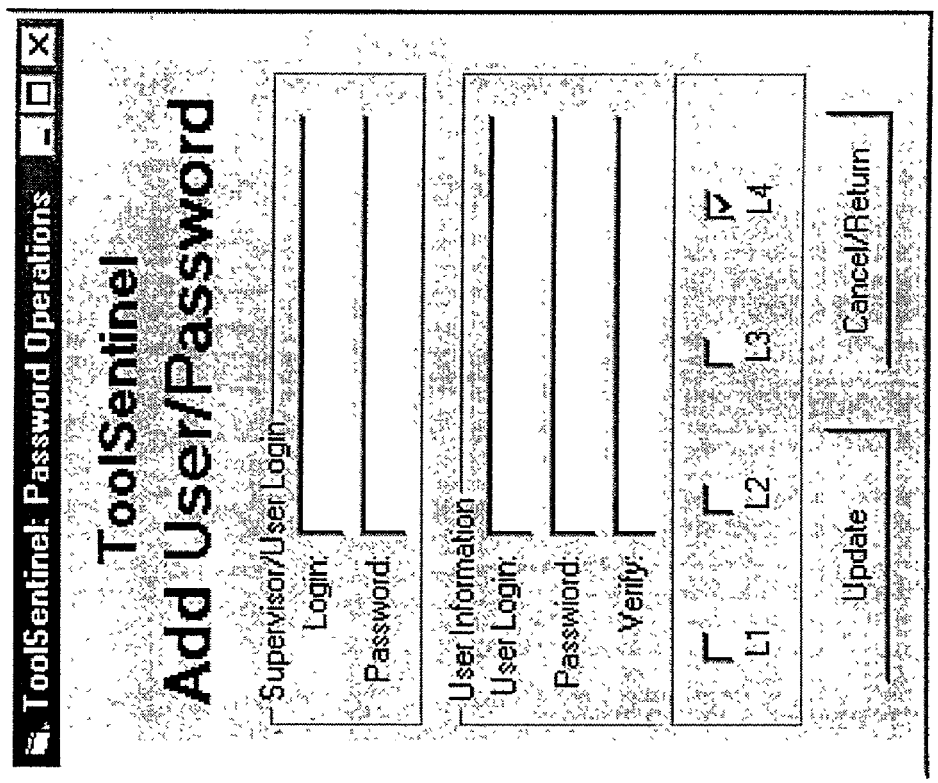
FIG. 9 shows a user password display of the monitoring apparatus in accordance with the invention.

With reference to FIG. 9, the apparatus 10 is preferably secured by password-based access control. In an industrial setting it is often desirable to limit access to the system, for example to only several trusted machine operators and a shift supervisor. It is also often desirable for the various users to have different access levels. In the present invention, a user password setup dialog box 130 is provided to allow a supervisor to set up a user password. The dialog box 130 requires a supervisor or other relatively high-level user who already has access to the monitoring apparatus 10 to enter his or her login name and password when entering a new user login and password. The supervisor also selects the authorization level of the new user: L1, L2, L3, or L4. Of course, any number of authorization levels other than five can be implemented as desired. In the illustrated embodiment, level L4 is the highest level, and can correspond for example with a senior manager.

Figure 10:
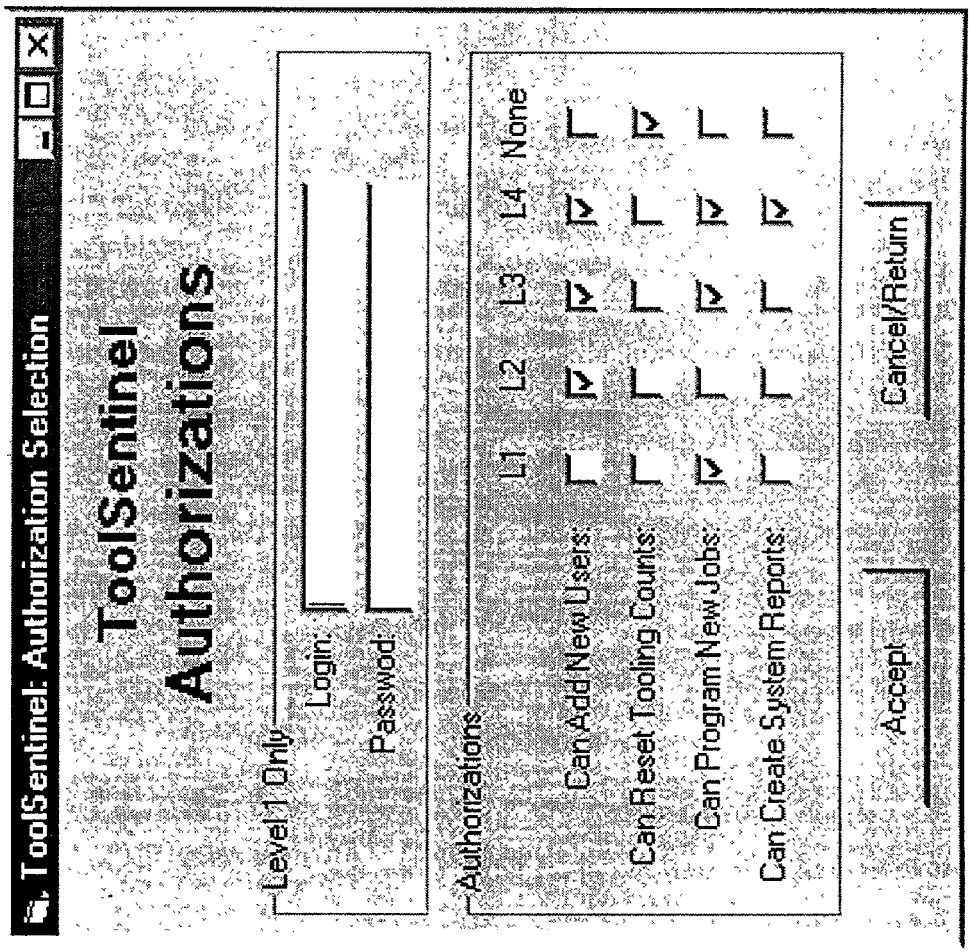
FIG. 10 shows a user authorization display of the monitoring apparatus in accordance with the invention.

With reference to FIG. 10, an authorizations setup dialog screen 140 is provided to limit access to selected system functions. Preferably, only level L2, L3, and L4 level users can add new users to the system. The "None" column checked in the second row of the dialog screen 140 indicates that no security clearance or special authorizations are needed to reset tooling counts. More particularly, any level user L1–L4 has authority to reset tooling counts. With regard to the ability to program new jobs, only users at levels L1, L3, and L4 can perform this function. Lastly, only L4 level users are authorized to create system reports. As noted above, level L4 is the highest level and preferably corresponds to the authorization granted to a senior manager.

FIGS. 9 and 10 show dialog boxes 130, 140 for the preferred password-based access system. Those skilled in the art will recognize that other dialog boxes, for example similar to the new user creation dialog box 130 of FIG. 9, are preferably included to perform other common password security operations such as changing a password or deleting a user account.

Those skilled in the art will appreciate the password-based user access interface can be modified in various ways to conform to particular workplace or manufacturing environments. For example, in an alternative preferred embodiment, the machines are grouped into two or more classes, and the authorization dialog box 140 is modified to include separate authorizations specific to each machine class. This embodiment is suitable for manufacturing environments in which machines are highly differentiated, or where certain machines are particularly damage-prone or dangerous so that access to those machines is advantageously limited.

Figure 11:
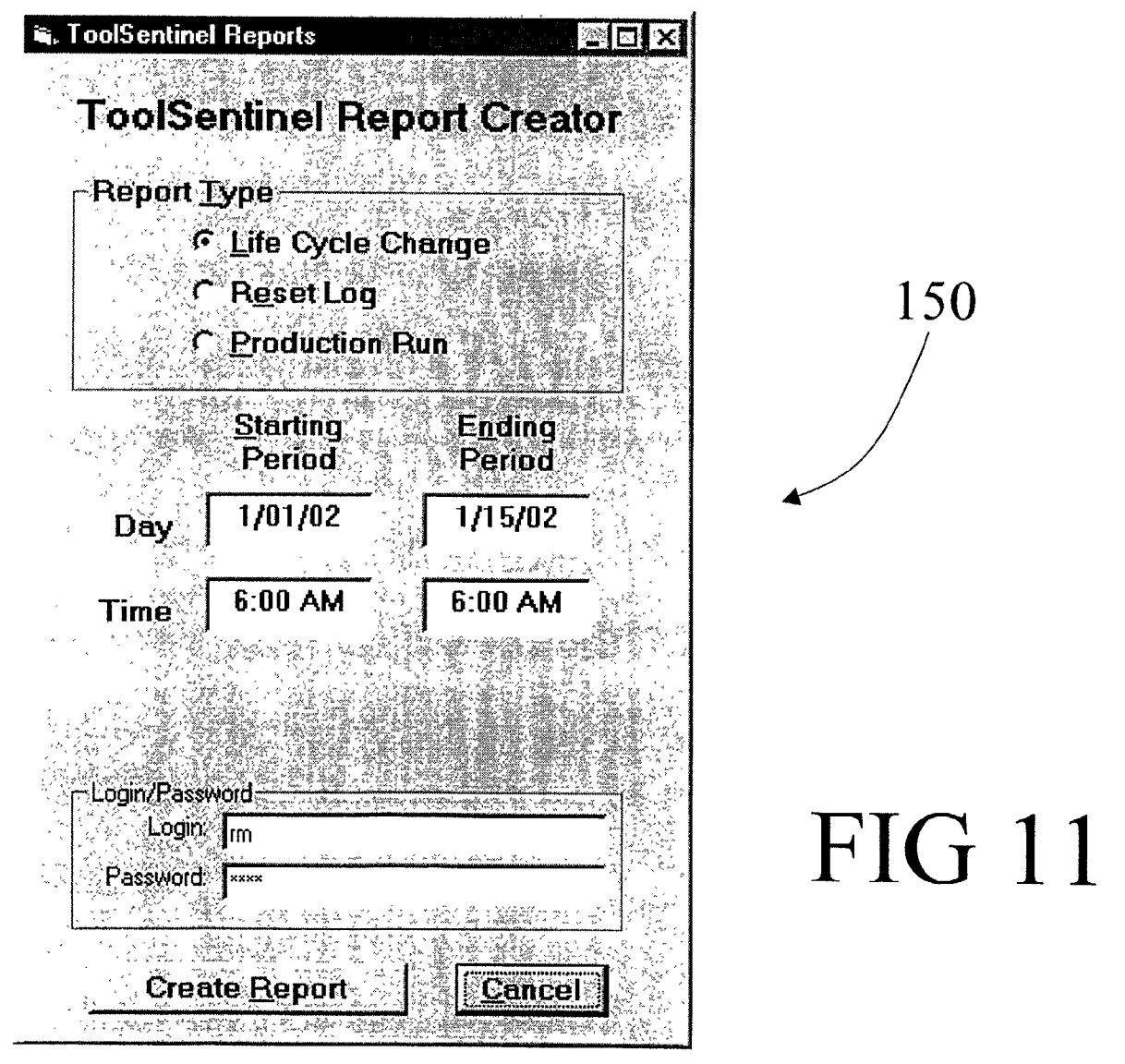

With reference to FIG. 11, the monitoring apparatus 10 advantageously includes a report generator for producing various types of reports. In the preferred illustrated embodiment, three types of reports can be generated: life cycle change reports; tool reset logs; and production run reports. Of course, those skilled in the art will recognize that more, fewer, or different report formats. FIG. 11 shows a report creator dialog box 150 which allows an authorized user (e.g., a user with L4 access according to FIG. 10) to select a report type and time period.

With reference to FIG. 12, a life cycle change report 160 is provided to track and display changes made to the tool life values. In the embodiment illustrated, the life cycle change report 160 indicates that the tool life value for two tools, numbered 4 and 7, were changed on machine #2 between a start date and start time of Jan. 1, 2002 and 06:00 respectively and an end date and end time of Jan. 15, 2002 and 06:00 respectively. In the exemplary report other information is also shown such as the part number of the tool, the time of the change out, the planned cycle life of the old and new tools, and the identity of the individual associated with the tool replacement. Of course additional, less or different information can be included. It is to be appreciated that by producing reports that key off of start/end times and start/end dates, specific work shifts, hours, weeks, days, etc. can be tracked and reported.

Figure 13:
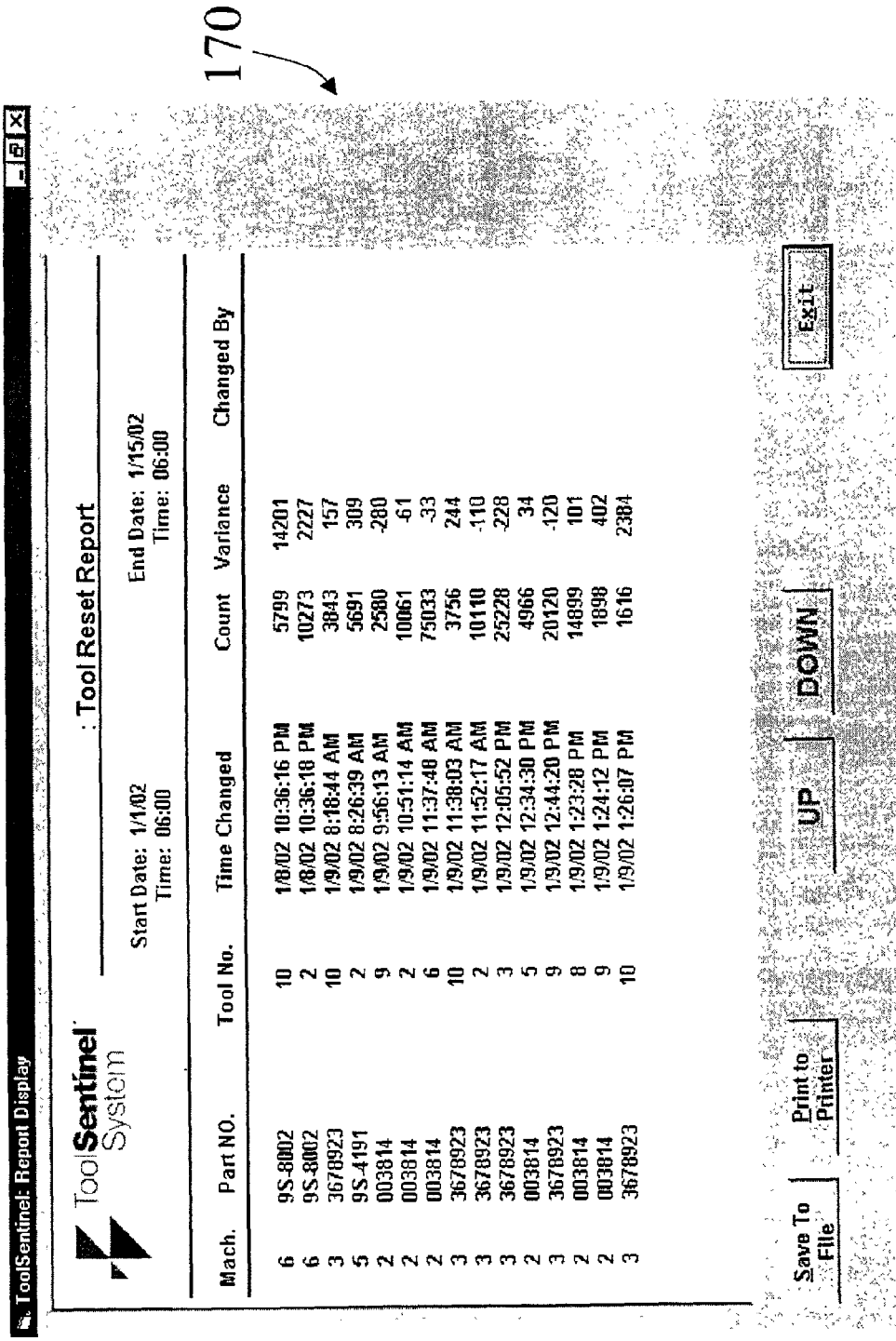
FIG. 13 shows a tool reset report display of the monitoring apparatus in accordance with the invention.

With reference to FIG. 13, the preferred tool reset log 170 lists all tool change outs between the start date of Jan. 1, 2002 and the end date of Jan. 15, 2002, both at start and end times of 06:00. In this report, each tool is identified by machine and tool number, and the part number is listed for convenience. Additionally, the cycle count at change out is listed, along with a variance. Those skilled in the art will appreciate that additional, less or different information beyond that shown in FIG. 13 can be included in a tool reset report. It is to be appreciated that the reset log provides an opportunity to adapt the tool life parameter values based on real world tool life values. To that end, operators or supervisors change tools based on an observation of the tool in the manufacturing process. If the tool is showing signs of abnormal early wear, it will be changed out and the tool variance noted on the tool reset report page 170. Similarly, if the tool lasts longer than expected, the variance count will reflect this as well. Adjustments in the tool life parameter setting based on real world observations can be made as appropriate.

The variances listed on the reset log 170 are functional estimates of how closely the actual count at change out matches the planned tool life, e.g. as entered in the tool setup dialog box 70 shown in FIG. 4. Suitable functional estimates include a standard deviation or statistical variance indicative of the variation from planned cycle life for several previous replacements of the tool. Preferably, the variance is arranged such that a large estimate implies significant deviations from the planned cycle life whereas a smaller variance indicates good agreement between the planned cycle life and the actual tool replacement times. For example, tool number 10 of machine #6 shows a very large variance of 14201, which suggests that either the planned cycle life for this tool should be adjusted to more closely agree with the tool life presently being obtained or the operator is changing the tool too early. It is to be appreciated that the primary purpose of the rest log is to determine or demonstrate when the operator is changing tools. There are two (2) main reasons an operator may have a large variance, the tool is being over/under run or the tool life value needs to be changed. In contrast to tool number 10, tool number 6 of machine #2 has a variance of only −33, indicative of a realistic and predictive planned cycle life value and that the operator is changing the tool on time.

Figure 14:
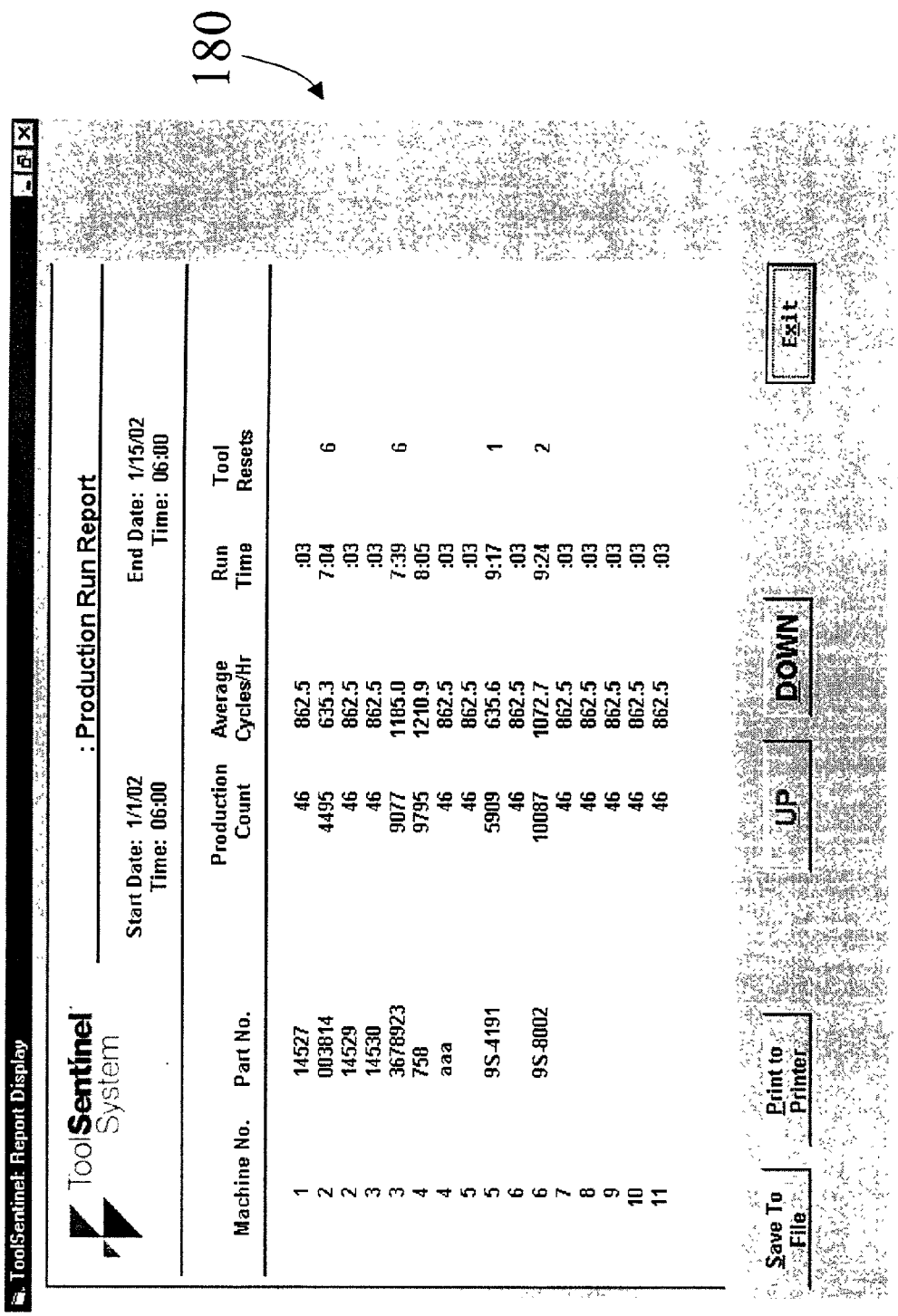
FIG. 14 shows a production run report display of the monitoring apparatus in accordance with the invention.

With reference to FIG. 14, an exemplary production run report 180 indicates statistics for machines during a period between a start date and time of Jan. 1, 2002 at 06:00 and an end date and time of Jan. 15, 2002 at 06:00. Such a report is particularly suitable for creation after fulfilling a production order to determine machine-related expenses incurred in fulfilling the order. Of course additional, less or different information can be included. The report 180 can also be useful for preparing a price quotation for a similar production run.

It is to be appreciated that one purpose of the production run report 180 is to determine how many parts were made in a given period of time. Another purpose is to determine how much time the machine was up and running during a given period of time. An additional purpose is to display the rate at which the machine was operating during the time it was running. Yet still further another purpose of the production run report 180 is to show the number of tool resets which were required for the operator to perform during a given period of time.

In a preferred embodiment, reports such as the exemplary reports 160, 170, 180 are optionally printed or saved to diskette or another storage medium.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for monitoring a manufacturing machine having at least one associated tool, the manufacturing machine engaged in repetitively producing a machined part, the monitoring method being performed on an electronic device having a display device for displaying information to an associated human operator, the method comprising:
   receiving a tool life parameter value for the associated tool representing an expected number of machined parts to be produced by the associated tool;
   detecting machine cycles of said manufacturing machine as a cycle count, each machine cycle corresponding to production of at least one machined part;
   calculating an operating rate of the manufacturing machine based on the cycle count; and,
   estimating a remaining time for tool replacement based on the cycle count, the machine operating rate, and the received tool life parameter value.

2. The method as set forth in claim 1, further including:
   defining a warning threshold time parameter value;
   comparing the estimated time remaining with the warning threshold time parameter value; and,
   displaying a status of the manufacturing machine based on the comparing step.

3. The method as set forth in claim 2, wherein the displaying step includes:
   displaying a first indicator comprising a green visual indicator when the comparing step results in an estimated time remaining that is greater than the warning threshold time parameter value; and,
   displaying a second visual indicator when the comparing step results in an estimated time remaining that is less than the warning threshold time parameter value.

4. The method as set forth in claim 3, wherein the displaying of said second indicator includes:
   displaying a yellow visual indicator when the estimated time remaining is greater than zero; and
   displaying a red visual indicator when the estimated time remaining is less than zero.

5. The method as set forth in claim 1, further including:
   displaying a tools table showing the estimated remaining time for each of the at least one associated tool of the machine.

6. The method as set forth in claim 1, further including:
   sorting a tools table containing the estimated remaining time for each of the at least one associated tool of the machine from shortest remaining time to longest remaining time; and,
   displaying the sorted tools table on said display device.

7. A method of monitoring a manufacturing machine having a plurality of associated tools, the manufacturing machine engaged in producing machined parts at a substantially constant rate, the method comprising:
   storing a tool life parameter value for each of the plurality of associated tools representing an expected number of machined parts to be produced by each of the plurality of associated tools;
   detecting machine cycles of said manufacturing machine as a cycle count, each machine cycle corresponding to production of at least one machined part;
   calculating a machine operating rate of the manufacturing machine based on the cycle count; and,
   determining a remaining time for tool replacement based on the cycle count, the machine operating rate, and said tool life parameter value.

8. The method as set forth in claim 7, further including:
   defining a warning threshold time parameter value;
   comparing said remaining time for tool replacement with the warning threshold time parameter value; and,
   displaying a status of the manufacturing machine based on the comparing step.

9. The method as set forth in claim 8, wherein the displaying step includes:
   generating a first signal when said remaining time for tool replacement is greater than said warning threshold time parameter value; and,
   generating a second signal when said remaining time for tool replacement is less than said warning threshold time parameter value.

10. The method as set forth in claim 9, wherein generating said second signal includes:
    displaying a first visual indicator when said remaining time for tool replacement is greater than zero; and
    displaying a second visual indicator when said remaining time for tool replacement is less than zero.

11. The method as set forth in claim 7, further including:
    providing a tools table associating said remaining time for tool replacement with each of said plurality of associated tools of the machine.

12. The method as set forth in claim 7, further including:
    sorting a tools table associating said remaining time for tool replacement with each of the plurality of associated tools of the machine from shortest remaining time to longest remaining time; and,
    displaying the sorted tools table on said display device.

13. The method as set forth in claim 7 wherein said determining includes:
    determining a time for tool replacement for each of said plurality of associated tools of the manufacturing machine based on the cycle count, the machine operating rate, and said tool life parameter value for each of the plurality of associated tools.

14. A monitoring apparatus for monitoring an associated manufacturing machine having a plurality of tools and being engaged in repetitive machining of an associated part, the machining of the associated part relating to a machine cycle of said associated manufacturing machine, the monitoring apparatus comprising:
    a machine cycle detector device adapted to detect an occurrence of a machine cycle;
    a counter in operative communication with the machine cycle detector device and adapted to count said machine cycles;
    a machine speed processor operatively associated with the counter and adapted to estimate a rate of said machine cycles;

a data storage device storing a maintenance schedule associating each of the plurality of tools with a number of machine cycles of useful life of the tool before recommended replacement;

a tools processor operatively associated with the counter, the machine speed processor, and the data storage device, the tools processor estimating, for each of said plurality of tools, a remaining operating time before scheduled replacement;

a machine viability processor operatively associated with the tools processor, the machine viability processor estimating a remaining operating time for the machine before scheduled replacement of a first tool among said plurality of tools having a smallest estimated remaining operating time; and, a signal generating device operatively associated with the machine viability processor for generating a signal representative of said remaining operating time for the machine.

15. The monitoring apparatus as set forth in claim 14, wherein the machine cycle detector device includes:
a plurality of sensors adapted to detect triggering states of cycle sensors of said manufacturing machine.

16. The monitoring apparatus as set forth in claim 15, wherein each sensor of said plurality of sensors includes:
a filtering circuit conditioning an output of the cycle sensor.

17. The monitoring apparatus as set forth in claim 14, wherein the machine cycle detector device includes a sensor adapted to detect a machine operation.

18. The monitoring apparatus as set forth in claim 14, wherein the signal generating device includes a display device adapted to selectively display, when the remaining operating time of said associated manufacturing machine is less than a predetermined threshold warning time, first indicia that maintenance should be performed.

19. The monitoring apparatus as set forth in claim 17, wherein the display device is adapted to display, when the remaining operating time of said machine is less than a predetermined urgency threshold, second indicia different than said first indicia that maintenance is urgent.

20. The monitoring apparatus as set forth in claim 17 further including a status indicator for indicating a machine status based on the estimated remaining operating time for the machine.

21. The monitoring apparatus as set forth in claim 17, further including:
a password-based user interface for providing selected user access to selected portions of the monitoring apparatus.

22. A monitoring apparatus for monitoring a set of associated manufacturing machines each having a plurality of tools, the set of machines being engaged in repetitive machining of a part, the machining of a part relating to a machine cycle, the monitoring apparatus comprising:
an input device adapted to detect occurrence of a machine cycle;
a counter in operative communication with the input device for counting machine cycles;
a machine speed processor operatively associated with the counter for estimating a temporal rate of machine cycle occurrences;
a data storage device for storing a maintenance schedule indicating a number of machine cycles between recommended replacement for each of said tools;
a tools processor operatively associated with the counter, the machine speed processor, and the data storage device, the tools processor estimating a remaining operating time for each tool before scheduled replacement;
a machine viability processor operatively associated with the tools processor, the machine viability processor estimating remaining operating times for the machine before scheduled replacement of each of said tools; and,
a display device operatively associated with the machine viability processor for displaying selected remaining operating times.

23. The monitoring apparatus as set forth in claim 22, wherein the input device includes:
a plurality of sensors adapted to detect triggering states of cycle sensors of said set of manufacturing machines.

24. The monitoring apparatus as set forth in claim 23, wherein each sensor of said plurality of sensors includes:
a filtering circuit conditioning an output of the cycle sensor.

25. The monitoring apparatus as set forth in claim 22, wherein the input device includes:
a sensor that detects a machine operation.

26. The monitoring apparatus as set forth in claim 22, wherein the display device is adapted to selectively display, when the remaining operating time of one of said set of machines is less than a threshold warning time, an indicia that maintenance should be performed.

27. The monitoring apparatus as set forth in claim 26, wherein the indicia indicating that maintenance should be performed includes a yellow display background.

28. The monitoring apparatus as set forth in claim 22, wherein the display device is adapted to display, when the remaining operating time for one of said set of machines is less than an urgency threshold, an indicator that maintenance is urgent.

29. The monitoring apparatus as set forth in claim 28, wherein the indicator indicating that maintenance is urgent includes a red display background.

30. The monitoring apparatus as set forth in claim 22 wherein the associated set of manufacturing machines further include a status indicator and the monitoring apparatus further includes:
a monitor output communicating the machine viability processor and with the status indicator of the manufacturing machine for indicating a machine status via the status indicator based on the estimated remaining operating time for the machine.

31. The monitoring apparatus as set forth in claim 22 wherein the associated set of manufacturing machines further include a set of stacked visual indicators and the monitoring apparatus further includes:
a monitor output communicating the machine viability processor and with the set of stacked visual indicators for indicating a machine status via the set of stacked visual indicators based on the estimated remaining operating time for the machine.

32. The monitoring apparatus as set forth in claim 22, further including:
a password-based user interface for providing selected user access to selected portions of the monitoring apparatus.

33. A monitor for monitoring a manufacturing machine including a plurality of tools, the monitor comprising:
a means for detecting machine cycles of said manufacturing machine;

a means, communicating with the detecting means, for determining a machine cycling rate; and, a means for projecting tool change times for each of said plurality of tools based on the machine cycling rate and pre-selected tool cycle lifetime values.

34. The method as set forth in claim 33, further including:

a means for notifying an associated machine operator in advance of a projected tool change time.

* * * * *